United States Patent [19]

Triggs et al.

[11] Patent Number: 4,617,985
[45] Date of Patent: Oct. 21, 1986

[54] HEAT PIPE STABILIZED SPECIMEN CONTAINER

[75] Inventors: Geoffrey W. Triggs; Richard J. Lightowlers, both of Warrington; Derek Robinson, Preston; Graham Rice, Wokingham, all of England

[73] Assignee: United Kingdom Atomic Energy Authority, London, England

[21] Appl. No.: 769,745

[22] Filed: Aug. 27, 1985

[30] Foreign Application Priority Data

Sep. 11, 1984 [GB] United Kingdom ............... 8422852

[51] Int. Cl.$^4$ .................. G05D 23/00; F28D 15/00
[52] U.S. Cl. .................................. 165/32; 165/47; 374/45; 374/57; 376/202; 376/245
[58] Field of Search .............. 374/45, 57; 165/47, 165/32; 376/245, 202

[56] References Cited

U.S. PATENT DOCUMENTS 3,525,386  8/1970  Grover ................................. 165/32
3,996,465 12/1976  Beauchede ......................... 376/202

FOREIGN PATENT DOCUMENTS

101119  2/1984  European Pat. Off. ............ 374/45
2053925 5/1972  Fed. Rep. of Germany ...... 376/202

Primary Examiner—Albert W. Davis, Jr.
Attorney, Agent, or Firm—Larson and Taylor

[57] ABSTRACT

A heat pipe stablized specimen container for irradiation of specimens at substantially constant temperature within a liquid metal cooled fast reactor comprises a heat pipe containing a vaporizable substance such as sodium. The container is of double-walled construction with the gap filled with argon and at top of the container a volume of argon is trapped within a cavity of the liquid metal level within the container in such a way that retention of argon in this zone is not dependent on sealing welds in the structure of the container, the argon blanket in this zone affording thermal insulation at the top of the container and also around part of the heat pipe, viz an adiabatic section of the latter. The heat pipe includes three layer wick structure 84 comprising an outer relatively fine mesh layer, a coarse intermediate layer and a fine inner layer for promoting unimpeded return of condensate to the evaporation section of the heat pipe while enhancing heat transfer with the heat pipe wall and reducing entrainment of the condensate by the upwardly rising vapor.

9 Claims, 12 Drawing Figures

HEAT PIPE STABILIZED SPECIMEN CONTAINER

BACKGROUND OF THE INVENTION

This invention relates to a heat pipe stabilised specimen container and is particularly concerned with a container suitable for location within the core of a liquid metal cooled fast breeder reactor so that certain properties, such as creep strength and ductility, of specimens can be investigated under high temperature conditions and when subject to irradiation. A specific application of the invention is in the investigation of fuel pin cladding materials.

The high temperature sensitivity of thermal creep requires that irradiation of the specimens should be conducted at near constant temperature which will typically be of the order of 700° C. However, there are difficulties in obtaining constant temperature in reactors when, for example, the reactor operating conditions vary and the reactor is not at full power with full flow of coolant. Consequently, to achieve near constant temperature irradiation of specimens independently of reactor variations, there is a need for effecting compensation of fluctuation in temperature.

FEATURES AND ASPECTS OF THE INVENTION

According to one aspect of the present invention there is provided a specimen container which incorporates a centrally located heat pipe around which there is an annular space for reception of specimens, the container being provided with inlet means for admitting liquid metal into the lower end thereof and restricted outlet means through which liquid metal can flow out of the container while leaving a space at the upper end of the container, which space is filled with low thermal conductivity gas, the container being of double walled construction along its length and at its lower end with low thermal conductivity gas filling the interspaces between the walls.

Preferably the heat pipe encloses a gas which is not condensable in use of the container as well as a vapourisable substance such as sodium, the heat pipe including an evaporation section which is in heat exchange with the specimen receiving space of the container, a condenser section which is in heat exchange with liquid metal flowing externally of the container and is separated from the evaporation section by an adiabatic section, and a gas buffer section, the arrangement being such that the rate of evaporation of said substance determines the volume occupied by the gas which, in turn, governs the volume available within the condensation section. With such an arrangement, maintenance of a desired temperature within the specimen container can be achieved by providing a relatively large buffer gas volume whose pressure is preset and changes only very marginally as heat is transferred from one end of the pipe towards the other by evaporation and condensation.

The double walled, gas filled construction together with the gas filled space at the upper end of the container provides an insulating barrier between the container interior and its exterior which, in use, is exposed to a flow of liquid metal coolant. In this way, radiative and conductive heat loss from within the container is minimised with the objective of ensuring that the heat pipe constitutes the primary source of heat loss from the container.

The provision of the restricted outlet means allows self filling of the container when installed in the reactor. In practice, the container will be housed within a tube and the liquid metal coolant will flow through the annular gap between the container and the tube thereby creating a pressure difference between the inlet and outlet means which induces a continual flow of coolant through the container. This is undesirable in terms of the resulting loss of heat from the container but the presence of a coolant flow path (as opposed to a stagnant body of liquid metal within the container) has the advantage that, in the event of gas release from a failed pressurised specimen, any liquid metal displaced out of the container by the released gas may re-enter as the gas vents off via the outlet means.

The outlet means is preferably so designed as to restrict coolant flow through the container while permitting, in the event of a failed specimen, refilling of the container with coolant at a sufficient rate to prevent undue rise in temperature within the container. Thus, in a preferred embodiment, the restricted outlet means may be in the form of a long, narrow bore pipe which may be coiled so as to achieve a long path length within the container, the inlet end of the pipe being positioned so that a sufficient volume of the low thermal conductivity gas is enclosed within the upper end of the container to prevent heat loss by conduction at the upper end of the container.

The gas at the upper end of the container is conveniently enclosed within a bell structure defined by a skirt depending from the top of the container and below the liquid metal level so as to ensure reliable sealing of the gas independently of, for example, welded connections between the inner and outer walls of the container and between those walls and an end plate closing the top of the container.

As a safeguard against failure of the heat pipe, the container preferably includes means for providing an alternative outlet in response to a predetermined temperature being exceeded, whereby sufficient coolant flow through the container can be achieved to prevent boiling of the liquid metal and stabilise the temperature. The temperature responsive means may comprise an outlet passage which is normally blocked by a member secured in place by a fusible substance, e.g. a braze metal, such that, on the predetermined temperature being exceeded, the substance melts to free the blocking member for movement into a non blocking position. Such movement may be gravity assisted. Preferably the fusible substance bonds the blocking member to a fixed member with the substance located between endwise facing surfaces rather than between peripheral surfaces of said members.

According to a further aspect of the invention there is provided a heat pipe enclosing a vapourisable substance and including an evaporation section and a condenser section which is separated from the evaporation section by an adiabatic section, the interior of the heat pipe being provided with a condensate-conducting structure extending from the evaporator section to the condenser section, said structure comprising inner and outer finely foraminated layers and an intermediate coarsely foraminated layer.

DESCRIPTION OF THE DRAWING

An embodiment incorporating the above aspects and features of the invention will now be described by way of example only with reference to the accompanying drawings in which.

DESCRIPTION OF PREFERRED EMBODIMENTS

Referring now to the accompanying drawings, and particularly FIGS. 1A-1D and 2, the specimen container 10 is accommodated within a twin walled cluster tube 12 which, in use, is disposed with its axis vertical and its spigot end 14 engaged in a support (not shown) mounted within a demountable sub-assembly (not shown) which itself is adapted for mounting within the core structure of a nuclear reactor. Typically, the demountable sub-assembly comprises a wrapper or shroud of hexagonal cross-section and six such cluster tubes may be accommodated within the wrapper.

Figure 1A:
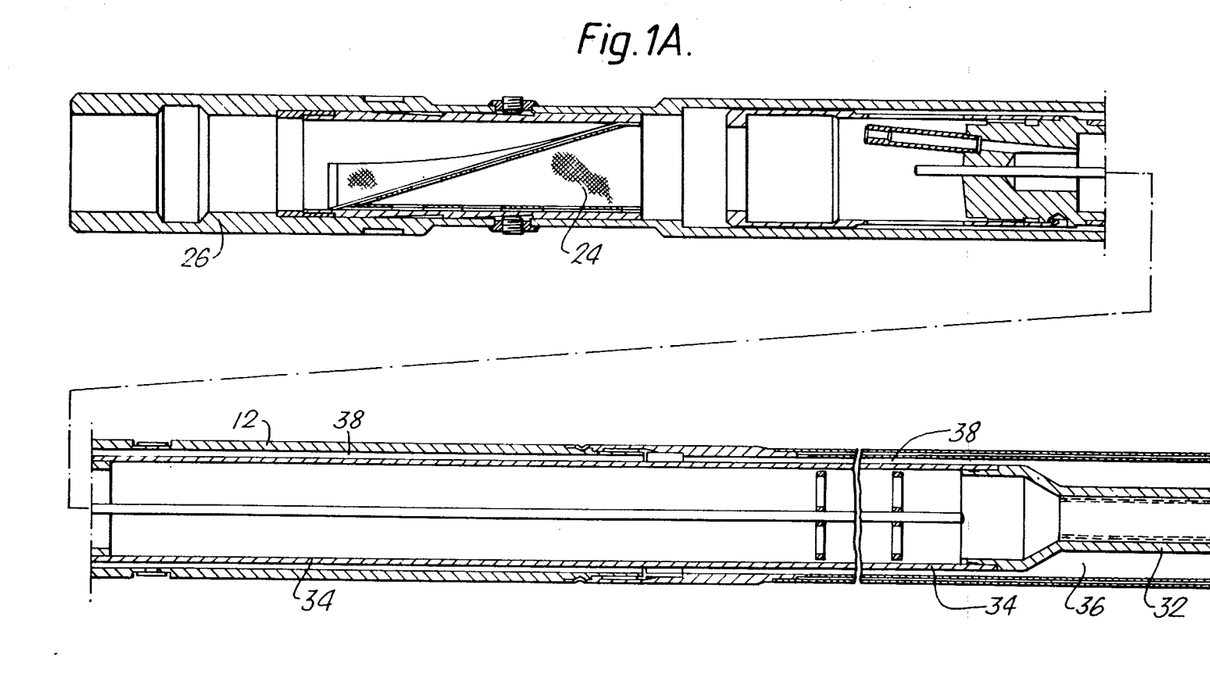
FIGS. 1A, B and C show successive axial sections of a cluster tube incorporating a heat stabilised specimen container in accordance with the invention.

At its lower spigot end, the cluster tube is provided with a series of inlets 16 through which liquid metal can be admitted so as to flow upwardly along the entire length of the cluster tube before discharging through the top end of the tube. In its lower end portion, the cluster tube is provided with a gag section comprising a series of gag plates 18 spaced axially and located by sleeve sections 20. The gag plates 18 serve to regulate the flow of liquid metal through the cluster tube. Above the gag section, there is a lifting head 22.

Figure 1B:
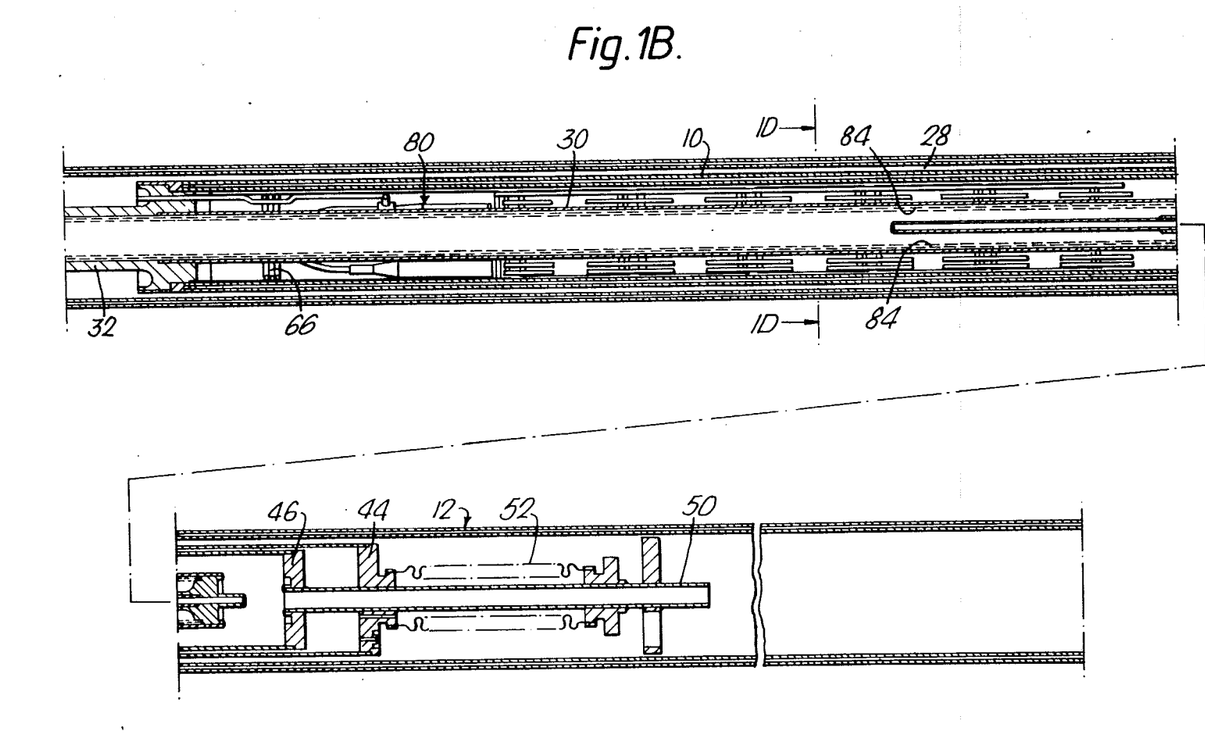
Figure 1C:
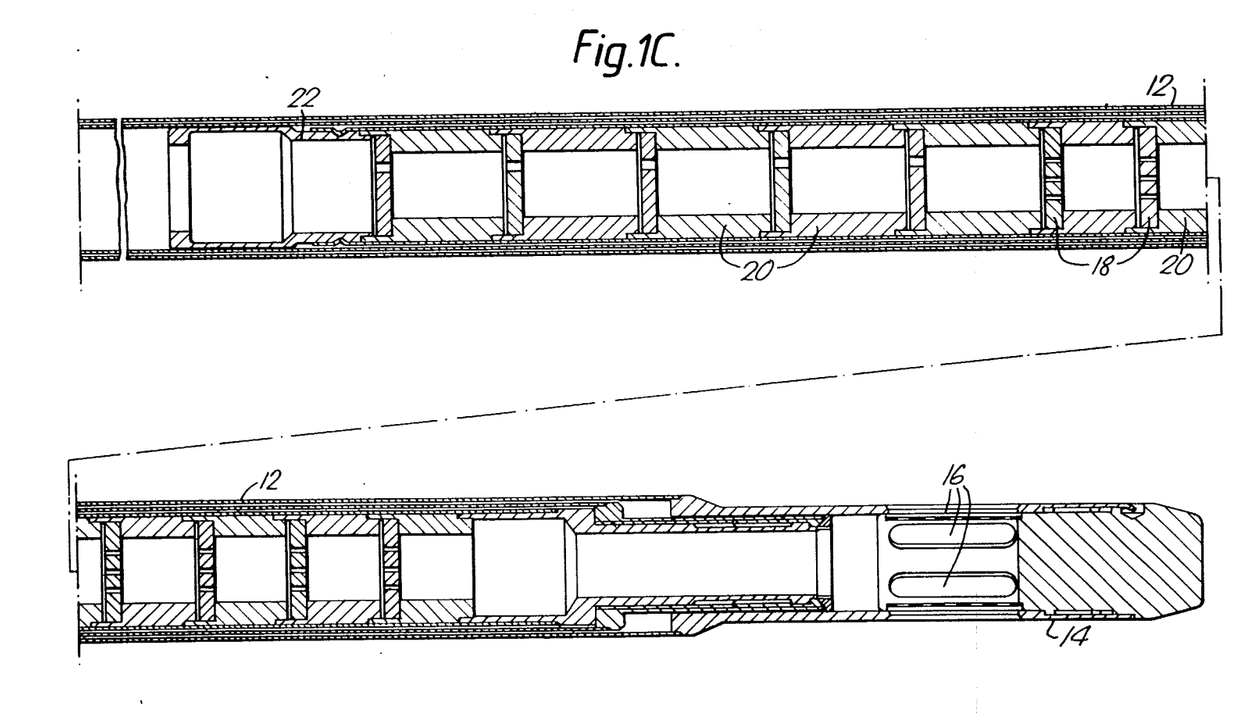

For the major part of its length, the cluster tube 12 is of double walled construction, the gap between these walls being filled with a gas of relatively low thermal conductivity, e.g. argon. The upper end of the cluster tube includes a filter 24 for filtering particulate material from the liquid metal (e.g. sodium).

The upper end of the cluster tube has a lifting head portion 26 to facilitate its loading into and unloading from the subassembly wrapper.

The specimen container 10 is located generally concentrically within the cluster tube so as to afford an annular gap 28 along which the major part of the upward flow of liquid metal proceeds. The container 10 incorporates a heat pipe unit 30 including a condenser section 32 and an elongated gas reservoir 34 which project upwardly from the container 10 and likewise define with the cluster tube 12 annular gaps 36, 38 for conducting the main flow of liquid metal. It will be observed that the cross-section of the gap 36 is somewhat greater than the gaps 28 and 38.

Figure 2:
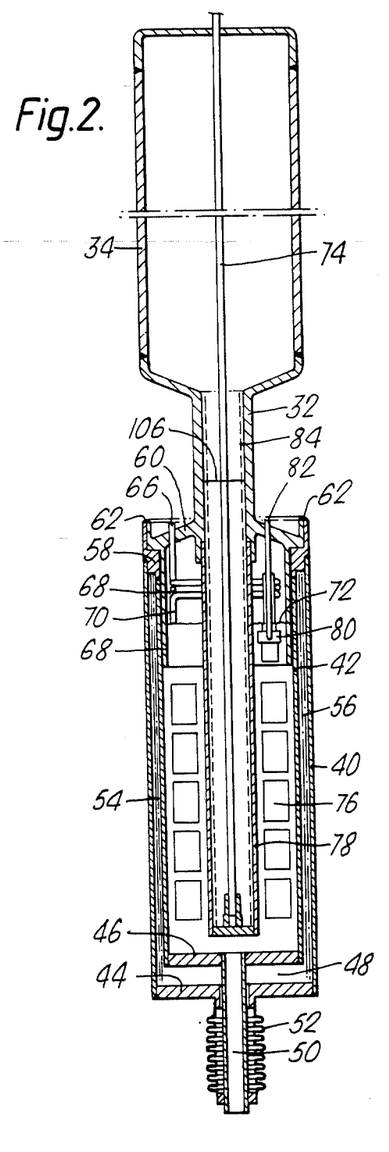
FIG. 2 is a diagrammatic longitudinal sectional view of the specimen container with a major part of the intermediate length of the gas buffer section omitted.

As shown more clearly in the schematic view of FIG. 2, the container 10 comprises an inner tube 40 and a concentric outer tube 42 with an annular gap therebetween which is filled with a gas of relatively low thermal conductivity (e.g. argon) so that the gas filled gap acts as an insulating barrier. The tubes 40 and 42 are closed at their bottom ends by end plates 44, 46 so as to define a gap 48 also filled with insulating gas such as argon. The liquid metal coolant is admitted to the inner tube 42 of the container via an inlet pipe 50 and sealing between the tubes 40 and 42 is effected by a stainless steel bellows 52 which also permits differential movement between the tubes 40 and 42.

The space 54 between the tubes 40, 42 may contain heat shields 56 and the gas presssure therein is such that at the operating temperature (i.e. when cluster tube is disposed in the core structure), the pressure in the inter space 54 approximates that of the surrounding liquid metal. Adjacent the top of the container, the interspace 54 is closed by an annular ring 58 which forms a seat for a flange 60 which is welded to the ring 58 by a circumferential weld 62. A skirt 64 depends from the flange 60 so as to define a cup or bell shaped cavity opening downwardly into the container 10. To permit liquid metal flow into the container via the inlet pipe 50, the upper end portion of the container has a vent arrangement comprising a small diameter pipe 66 which extends through the flange 60 and includes a coiled portion 68 terminating in a downwardly presented section 70 within the confines of the bell shaped cavity.

A suitable relatively low thermal conductivity gas, e.g. argon, is admitted into the container so that, as the coolant rises in the container 10, the gas is confined to the bell shaped cavity. The level 72 of the coolant within the container is determined by the lower end of the pipe section 70 and it will be seen that the arrangement is such that the gas is trapped in the cavity above the coolant level 72.

As shown in FIGS. 1B and 2, the heat pipe extends over the major part of the interior length of the container 10 and may be considered to comprise an adiabatic section extending between the coolant level 72 and the condenser section 32, and an evaporator section 78 extending from the adiabatic section towards the bottom end of the container. A mass of a vapourisable substance, such as sodium is contained within the heat pipe so that, in use, it will vaporise as a result of heat generated within the container by interaction of the radiation flux with the specimen 76. A small diameter thermocouple thimble tube 74 is inserted into heat pipe for use in filling and initial setting of the heat pipe. This tube 74 may be sealed after preliminary setting has been completed.

As a safety measure, the container includes a device 80 which is responsive to the temperature of the liquid metal coolant in the upper region of the container and serves to open a bypass pipe 82 to allow an increased rate of coolant flow through the container in the event of temperature rises in excess of a predetermined limit. The safety device will be described further hereinbelow with reference to FIGS. 6, 7 and 8.

The internal wall of the heat pipe 30 is provided with a tubular wick which is depicted by the broken lines 84 in FIGS. 1B and 2. The wick extends over the evaporator, adiabatic and condenser sections and comprises a triple layer cylindrical structure: an outer relatively fine mesh layer (typically 80 mesh, i.e. 80 strands to the inch (approx 31.5 strands per cm) in each of two orthogonal directions) next to the inner surface of the heat pipe wall for enhancing the transmission of radial heat flux by virtue of its pore size which promotes superheating of the liquid adjacent the pipe wall; a coarser intermediate mesh layer (typically 50 mesh—approx 20 strands per cm) to minimise flow impedance for liquid return from the condenser to the evaporator; and a finer inner mesh layer (typically 100 mesh—approx 40 strands per cm) to minimise entrainment of the liquid return flow in the vapour especially in the region of the adiabatic section while promoting increased capillary pumping pressure in the evaporator section so as to draw the liquid inwardly for re-evaporation. The mesh layers may be spot welded to the inner wall of the heat pipe.

Figure 1D:
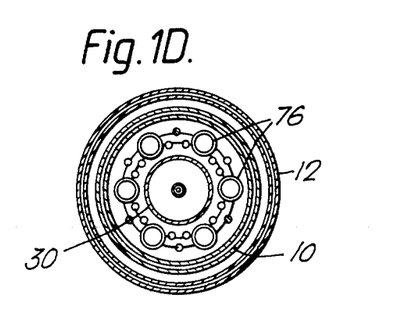
FIG. 1D is a cross-sectional view taken on the line 1D—1D in FIG. 1B.
Figure 3:
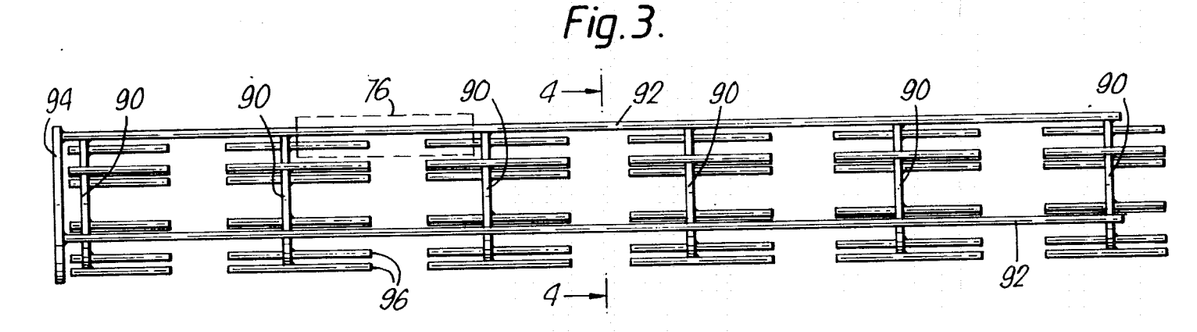
FIG. 3 is a side view of a specimen-carrying cage.
Figure 4:
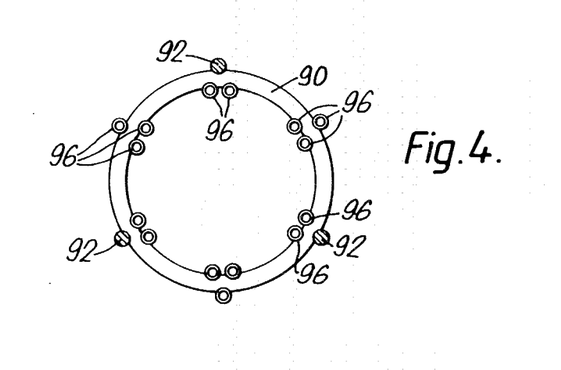
FIG. 4 is a cross-sectional view of the cage in the direction 4—4 in FIG. 3.

The container further includes a specimen locating cage (not shown in FIG. 2) which is shown is FIGS. 1D, 3 and 4. The cage comprises a series of rings 90 located in axially spaced relation by a number (e.g. 3) of equally circumferentially spaced rods 92 which are interconnected at their upper ends by a top support ring 94. Each ring 92 has associated with it a number of specimen-receiving spaces each defined either by three pins 96 or by two such pins 96 and one of the rods 92—see FIG. 4. These spaces aid location of the specimen 76 in the manner indicated in FIGS. 1D and 3 so as to prevent bunching of the specimens without constraining swelling thereof. In practice, the specimens will typically be in the form of closed tubular cylinders which may be pressurised.

Figure 5:
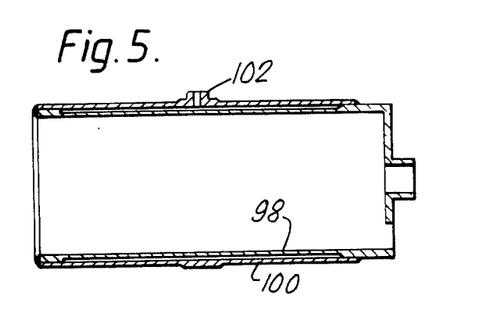
FIG. 5 is a longitudinal sectional view of a thermal barrier sleeve located at the lower end of the heat pipe.

Because of the presence of the relatively thick section end plates 46 and 44 in which heat is generated by the radiation flux, the lower end of the heat pipe may be subject to an undesirably high heat flux transmitted via the peripheral wall thereof. To overcome this, the lower end of the heat pipe is encircled by a heat insulating element which, as shown in FIG. 5, comprises an inner sleeve 98 and an outer sleeve 100 defining between them an annular gap which is filled with a gas, preferably one having a higher thermal conductivity than argon, e.g. helium. The helium is admitted via a port 102 which is thereafter sealed, e.g. by welding.

In use, the heat pipe is filled with a predetermined amount of argon gas and small amount of sodium sufficient, when vaporised, to ensure that the wick voids are filled with sodium. When heat is applied externally to the evaporator section 78, the sodium liquid vaporises absorbing the latent heat of vaporisation. The vapour then flows to the condenser section 32 where it liquifies, returning the latent heat to its surroundings, i.e. externally of the specimen container 10. The cycle is completed with the return of the condensate to the evaporator by capillary and gravitational action through the wick structure. The non-condensable argon gas is displaced by the sodium vapour into the gas reservoir 34 and the upper section of the condenser 32, thus thermally shutting off that part of the condenser filled with gas. The sodium vapour/argon gas interface 106 is depicted diagrammatically in FIG. 2. The gas pressure will reach a state of equilibrium with the vapour pressure and this determines the temperature at which the sodium in the heat pipe will vaporise.

The amount of evaporation in the heat pipe is controlled by the heat generated in and around the specimens, i.e. by the heat flow down the radial temperature gradient into the heat pipe. An increase in the sodium evaporation rate will displace the argon upwardly along the condenser 32 thereby increasing the area available for condensation. By employing a gas reservoir 34 of large volume, the resulting pressure rises are small. Also, with sodium as the working fluid, the pressure has a relatively small effect on the boiling point at operating temperatures of the order of 690° C. By these means, the temperature of the specimens remains relatively unaffected by changes in the amount of heat generated in them.

A feature of the invention is that, because the argon gas is trapped by the bell shaped cavity, reliance does not have to be placed on the sealing weld 62. Thus, the interior of the container is thermally insulated from its surroundings in a relatively simple manner, i.e. by the argon trapped in the cavity and also in the gap 54 and space 48.

Figure 6:
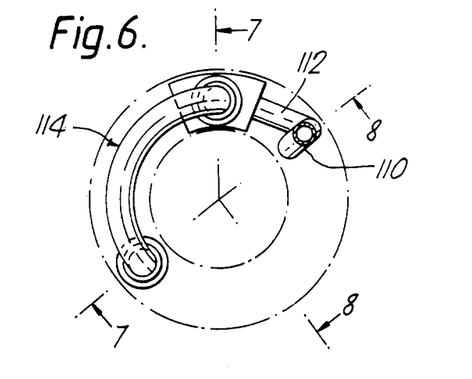
FIG. 6 is a plan view of a fusible plug device housed within the specimen container.
Figure 7:
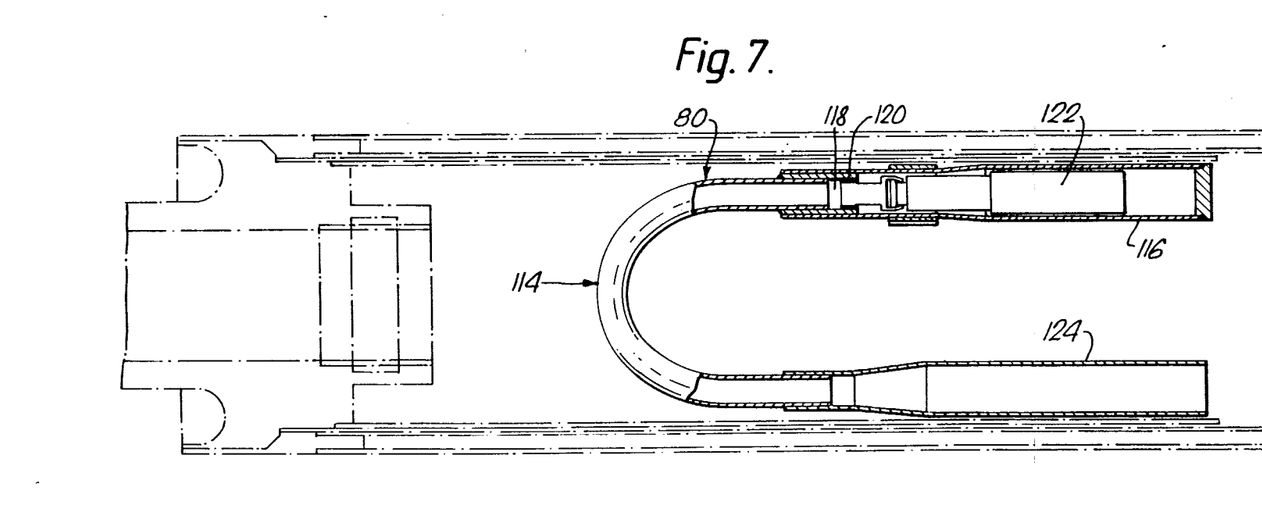
FIG. 7 is a partially sectioned side view of the plug device, the section being in the direction 7—7 in FIG. 6.
Figure 8:
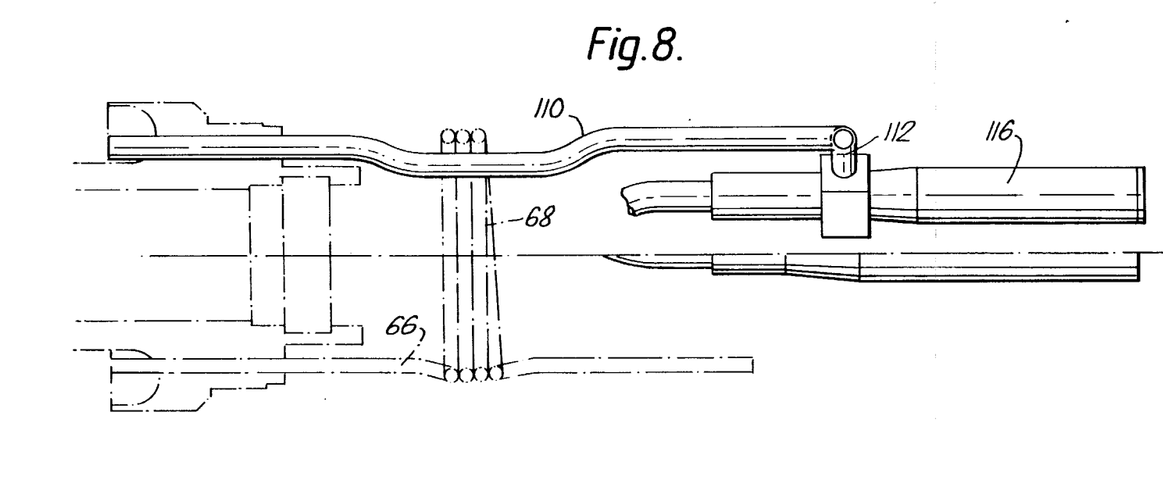
FIG. 8 is a view of the device in the direction 8—8 in FIG. 6.

The bypass device 80 is shown in greater detail in FIGS. 6, 7 and 8. The device 80 when effective as a bypass, operates in parallel with the small diameter pipe 66 and comprises a larger diameter pipe 110 connected to an outlet port 112 in one limb 116 of an inverted U tube 114 which is partially immersed below the level of the liquid sodium. The limb 116 has its lower end closed and is sealed above the outlet 112 by a stainless steel plug 118 brazed in position by a ring 120 of braze material to which a relatively heavy weight 122 is attached. The arrangement is such that argon gas is trapped on each side of the plug 118 to prevent direct sodium contact with the braze material during normal operation. Also, the U tube is immersed in the sodium to such an extent that the plug 118 and braze 120 is below the sodium level whereby these components are maintained at the same temperature as the sodium. The braze material is selected so that it will melt at a selected temperature, e.g. 930° C., indicative of failure of the heat pipe. Upon melting of the braze material, the plug is freed and is caused to drop with the assistance of the weight 122 and also the pressure difference across the plug, opening a flow path from the inlet leg 124 of the U tube to the pipe 110 and allowing a substantial flow of sodium through the container.

Figure 9:
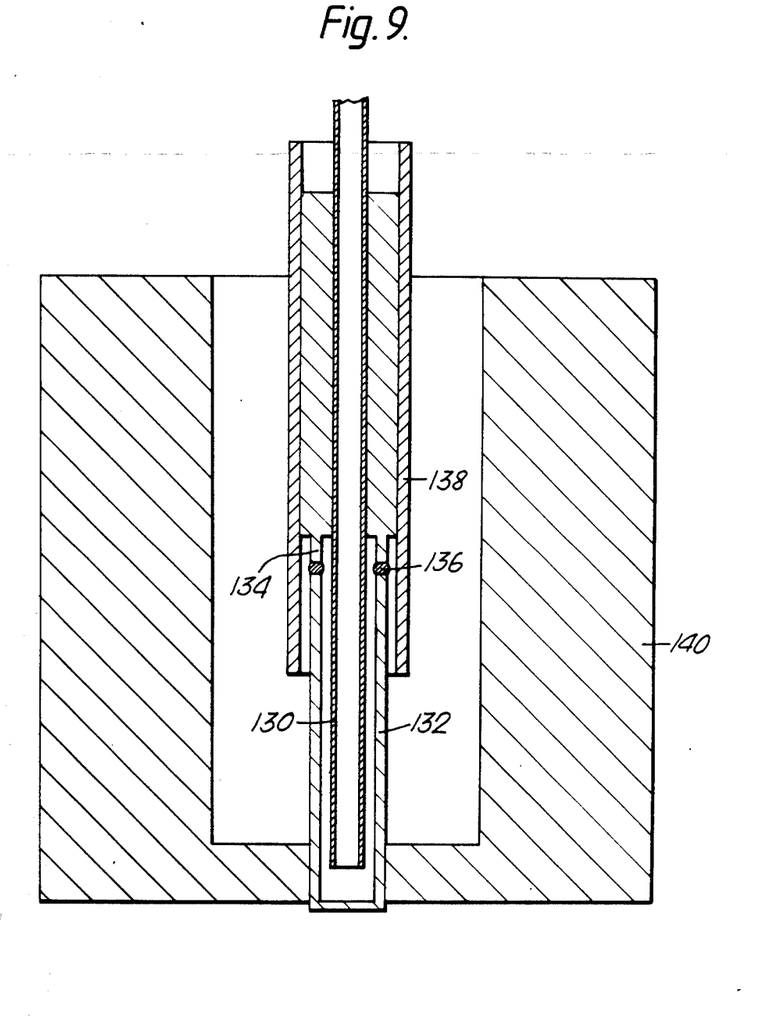
FIG. 9 is a schematic cross-sectional view of an alternative form of plug device.

FIG. 9 illustrates an alternative device to that shown in FIGS. 6, 7 and 8. In this embodiment, the outlet pipe 130 has its lower end extending into the specimen container and its upper end opens externally of the container. Sodium flow into the lower end of the pipe 130 is prevented by a sleeve 132 whose lower end is closed and whose upper end is connected to an annular shoulder 134 through the agency of a ring 136 of braze material which will fuse at a predetermined temperature, e.g. 930° C. The device is immersed in the sodium within the container so that the braze is at the same temperature as the sodium. The braze is protected from contact with sodium by argon gas trapped in annuli between a shroud 138 and the sleeve 132 at its outer surface and between the sleeve 132 and outlet pipe 130 at its inner surface.

It will be noted that the braze 136 is located between two endwise located surfaces and is not bonded to surfaces around its inner and outer peripheries. A large weight 140 is secured to the sleeve 132, the weight being of part-annular shape as seen in plan view so as to conform to the curvature of the container side wall. When the braze melts in response to an excessive rise in temperature, the weight 140 and sleeve 132 drop downwardly to unblock the lower end of the pipe 130 and permit a substantial flow of coolant through the container.

From the foregoing it will be seen that the heat pipe serves to establish and maintain a substantially isothermal specimen temperature, despite large variations of irradiation heat input. The neutron and gamma heat generated in the specimens and sodium within the specimen container is removed primarily by means of the heat pipe, with some additional heat losses by way of conduction and radiation across the gaseous thermal insulation barriers and by way of sodium leakage flow through the high resistance flow path provided by the long coiled pipe 66.

What is claimed is:

1. A specimen container for immersion in the liquid metal coolant of a liquid metal cooled nuclear reactor, said container incorporating a centrally located heat pipe around which there is an annular space for reception of specimens, the container further being provided with inlet means for admitting the liquid metal coolant into the lower end thereof and restricted outlet means through which liquid metal coolant can flow out of the container while leaving a space at the upper end of the container, which space is filled with low thermal conductivity gas, the container being of double walled construction along its length and at its lower end with low thermal conductivity gas filling the interspaces between the walls, the heat pipe enclosing a gas which is not condensable in use of the container as well as a vaporizable substance such as sodium, the heat pipe including an evaporation section which is in heat exchange with the specimen receiving space of the container, a condenser section which is in heat exchange with liquid metal coolant flowing externally of the container and is separated from the evaporation section by an adiabatic section, and a gas buffer section, and the arrangement being such that the rate of evaporation of said substance determines the volume occupied by the gas which, in turn, governs the volume available within the condensation section.

2. A specimen container as claimed in claim 1 in which said outlet means comprises means for restricting liquid metal coolant flow through the container while permitting, in the event of a failed specimen, refilling of the container with liquid metal coolant at a sufficient rate to prevent undue rise in temperature within the container.

3. A specimen container as claimed in claim 2 in which the restricted outlet means is in the form of a long, narrow bore pipe which may be coiled so as to achieve a long path length within the container, the inlet end of the pipe being positioned so that a sufficient volume of the low thermal conductivity gas is enclosed within the upper end of the container to prevent heat loss by conduction at the upper end of the container.

4. A specimen container as claimed in claim 1 in which the gas at the upper end of the container is enclosed within a chamber defined by a skirt depending from the top of the container and below the liquid metal level so as to ensure reliable sealing of the gas independently of connections between the inner and outer walls of the container and between those walls and an end plate closing the top of the container.

5. A specimen container as claimed in claim 1 including means for providing an alternative outlet in response to a predetermined temperature being exceeded, whereby sufficient liquid metal coolant flow through the container can be achieved to prevent boiling of the liquid metal coolant and stabilise the temperature.

6. A specimen container as claimed in claim 5 in which the temperature responsive means comprises an outlet passage which is normally blocked by a member secured in place by a fusible substance, e.g. a braze metal, such that, on the predetermined temperature being exceeded, the substance melts to free the blocking member for movement into a non-blocking position.

7. A specimen container as claimed in claim 6 in which said movement is gravity assisted.

8. A specimen container as claimed in claim 6 in which the fusible substance bonds the blocking member to a fixed member with the substance located between endwise facing surface of said blocking and fixed members.

9. A specimen container as claimed in claim 1 in which the interior of the heat pipe is provided with a condensate-conducting structure extending from the evaporator section to the condenser section, said structure comprising inner and outer finely foraminated layers and an intermediate coarsely foraminated layer.

* * * * *